United States Patent [19]

O'Brien

[11] Patent Number: 5,036,325
[45] Date of Patent: Jul. 30, 1991

[54] DOPPLER DETERMINATION SYSTEM FOR MTI RADARS

[75] Inventor: Edwin L. O'Brien, Fullerton, Calif.

[73] Assignee: Hughes Aircraft Company, Los Angeles, Calif.

[21] Appl. No.: 417,358

[22] Filed: Oct. 5, 1989

[51] Int. Cl.$^5$ .......................................... G01S 13/526
[52] U.S. Cl. ..................................... 342/160; 342/162
[58] Field of Search ....................... 342/160, 162, 159

[56] References Cited

U.S. PATENT DOCUMENTS

| | | | |
|---|---|---|---|
| 3,914,763 | 10/1975 | Green et al. | 342/161 |
| 4,041,488 | 8/1977 | Fishbein et al. | 342/114 |
| 4,093,950 | 6/1978 | Rhys | 342/149 |
| 4,093,951 | 6/1978 | Rhys | 342/149 |
| 4,222,049 | 9/1980 | Sirven et al. | 342/91 |
| 4,513,287 | 4/1985 | Penhard | 342/94 |
| 4,542,382 | 9/1985 | Hol | 342/91 |
| 4,630,052 | 12/1986 | Galati et al. | 342/159 |
| 4,654,665 | 3/1987 | Kiuchi et al. | 342/160 |
| 4,684,950 | 8/1987 | Long | 342/94 |
| 4,713,664 | 12/1987 | Taylor, Jr. | 342/91 |
| 4,914,442 | 4/1990 | Kretschmer, Jr. et al. | 342/162 |

Primary Examiner—Thomas H. Tarcza
Assistant Examiner—John B. Sotomayor
Attorney, Agent, or Firm—Wanda K. Denson-Low

[57] ABSTRACT

A doppler determination system uses an amplitude comparison of odd and even MTI functions derived from the same signal returns in an MTI radar system to determine the doppler frequency of a target return. The system determines the ratio of the amplitudes of the return of a single canceller circuit with a delay of 2/PRF and the amplitude of the return of a double canceller with two delays of 1/PRF. The ratio is then employed to estimate the doppler frequency of the return. The respective amplitudes of the two MTI circuits are also processed in a 3-dimensional radar application to provide estimates of the target radar cross-section and elevation angle, and with PRF switching to determine the target unambiguous range rate.

19 Claims, 3 Drawing Sheets

DOPPLER DETERMINATION SYSTEM FOR MTI RADARS

BACKGROUND OF THE INVENTION

The present invention relates to moving target indicator (MTI) radars, and more particularly to a doppler determination system for MTI radars employing an amplitude comparison of odd and even MTI functions derived from the same signal returns to determine the doppler frequency of a target return.

In radar systems using simple MTI waveforms, no estimate of target doppler is obtained. This makes it impossible to determine unambiguous range rate from the use of multiple pulse repetition frequencies (PRFs) and makes it impossible to do accurate angle estimation because of lack of knowledge of target amplitude when adjacent beams have different waveforms. As a result of this lack of knowledge, a three dimensional radar design may be required which uses redundant transmissions of different waveforms at the same angular position in order to estimate target angle. Further, radars may employ scan-to-scan PRF changes for velocity visibility rather than beam-to-beam or dwell-to-dwell because they could not otherwise determine angle from amplitude comparison between beams.

One class of 3 dimensional radar uses an antenna which rotates in azimuth while simultaneously generating a sequential scan of beams in elevation through either phase shifting or frequency scanning. The sequence of beams in elevation is called an elevation scan. The duration of an elevation scan is about the time that it takes the antenna to rotate through one azimuth beamwidth. The beams in elevation are spaced on the order of one elevation beam-width. The elevation of the target is measured by comparing the relative amplitude from adjacent beams which straddle the target position. This technique is called sequential lobing and is discussed in "Introduction to Radar System," M. Skolnick, McGraw Hill, 1962, pages 165-166. A simple estimate for the elevation angle is:

$$\theta_e = K(\log P_1 - \log P_2) + \theta_o \qquad (1)$$

where $P_1$ and $P_2$ are the return single pulse amplitudes from the target on beams 1 and 2, respectively, k is a constant having to do with the beam spacing and beam width and $\theta_o$ is the angle at the crossover between the beams.

Often MTI waveforms are used on the lower beams of the elevation scan to suppress clutter. Higher beams are above the clutter and MTI is not required. Range gated pulse doppler is seldom used in a radar of this type because it takes more time than a simple three pulse MTI which would reduce significantly the elevation coverage.

One problem that has occurred on radars of this type is the inability to make an angle measurement when the target is straddled by two beams, one of which is employing an MTI waveform and the other of which uses a single pulse. The problem here is that the equivalent single pulse amplitude, P, from the MTI waveform is unknown.

It is also sometimes desirable to estimate the radar cross section (RCS) of the target. Normally this can be done from the knowledge of the sensitivity parameters of the radar coupled with the knowledge of the range to the target and the return amplitude. This is of the form $$RCS = kP^2/R^4 \qquad (2)$$

where P is the single pulse return amplitude from the target, K is a constant having to do with the sensitivity of the radar and R is the range to the target as measured by the radar.

When MTI is employed, the equivalent single pulse amplitude is unknown, and it has heretofore not been possible to estimate the target RCS using an MTI waveform.

Often, the doppler frequency from a target will be ambiguous. This can occur when the range of potential target doppler frequencies is larger than the pulse repetition frequency (PRF). If the ambiguous doppler frequency is known, two or more PRFs may be used to determine the unambiguous doppler frequency and hence the range rate of the target. This is known as PRF switching and is described in "Introduction to Airborne Radar," George Stimson, Hughes Aircraft Company, 1983, pages 364-365. PRF switching is normally used with pulse doppler waveforms where an estimate of the ambiguous doppler may be made by comparing the amplitudes of the returns in adjacent doppler filters. This has not been useful to date for simple MTI waveforms because it was not possible to determine the doppler position of the return within the PRF interval.

It is therefore an object of the invention to provide a system for determining the doppler frequency (range rate) of the target return in a simple MTI radar system.

A further object of the invention is to provide a technique for estimating the equivalent single pulse amplitude of the MTI waveform and the elevation angle of a target detected by a 3-dimensional radar system which generates a sequential scan of beams in elevation when the target is straddled by two beams, one of which employs an MTI waveform, and the other of which uses a single pulse waveform or which uses an MTI waveform with different PRF.

Another object of the invention is to provide a means for estimating the radar cross-section of a target detected by an MTI waveform.

SUMMARY OF THE INVENTION

In accordance with the invention, a system is disclosed for estimating the doppler frequency of the target return produced by a moving target indicator (MTI) radar. The system includes a first MTI circuit responsive to the target return for providing a first MTI return signal of amplitude A and characterized by a frequency response having odd symmetry about the center of the PRF interval. The system further includes a second MTI circuit responsive to the target return for providing a second MTI signal of amplitude B and characterized by a frequency response having even symmetry about the center of the PRF interval.

The system further comprises a means responsive to the first and second MTI signals for generating a ratio signal indicative of the ratio of the relative magnitudes of the first and second MTI signals. The ratio is then used to estimate the target doppler in accordance with the relationship $PRF(\frac{1}{2} + (1/\pi)\tan^{-1}(2A/B))$.

The system is also advantageously employed in three-dimensional radars for estimating the equivalent single pulse return amplitude of MTI waveforms, which can then be employed to estimate the target elevation angle and radar cross-section. The unambiguous range rate can also be determined.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
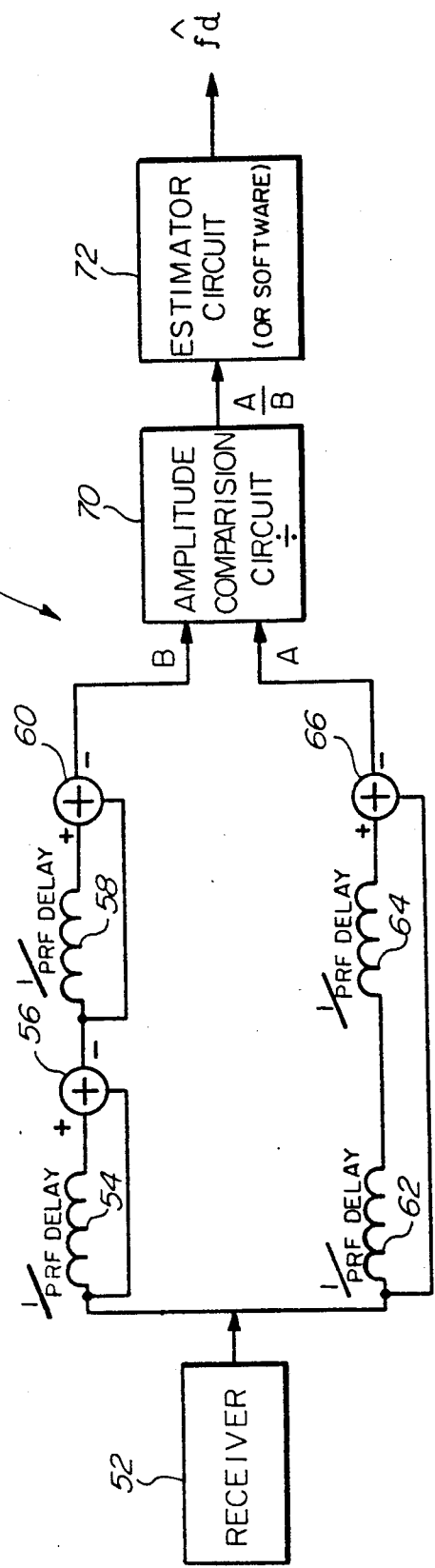
FIG. 1 is a simplified schematic block diagram of a doppler determination system embodying the invention.

The invention is illustrated in the simplified schematic block diagram of FIG. 1. Signals from the radar receiver 52 are applied to two MTI circuits. The first MTI circuit is a conventional double canceller circuit which comprises delay device 54, combiner device 56 for subtracting the receiver signal from the delayed receiver signal through delay device 54, delay device 58 and combining device 60 for subtracting the combined signal from combiner 56 from the delayed version of the combiner signal. The resultant signal is signal B. Each of the delay devices 54 and 58 introduces a 1/PRF time delay.

The second MTI circuit comprises the delay devices 62 and 64 which collectively delay the receiver signal by 2/PRF, and the combiner device 66 for subtracting the receiver signal from the delayed signal. The resultant combiner 66 output is signal A. This second canceller circuit resembles a single canceller circuit, except that it uses two times the delay of an interpulse period, i.e., $2 \times (1/PRF)$.

The two signals A and B are applied to an amplitude comparison circuit 70 which generates the ratio of the amplitudes of signal A to signal B, including polarity. This ratio signal A/B is further applied to a circuit (or computer software) 72 for generating the estimated value of the doppler frequency, $f_d$, from the ratio signal.

Figure 2B:
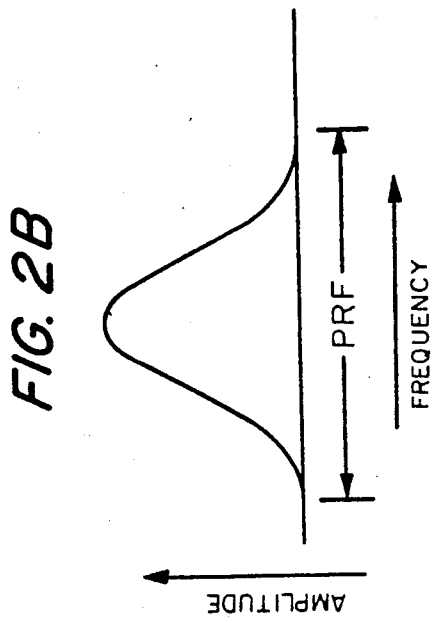
FIGS. 2A and 2B are frequency response of the two MTI circuits employed in the system of FIG. 1.
Figure 2A:
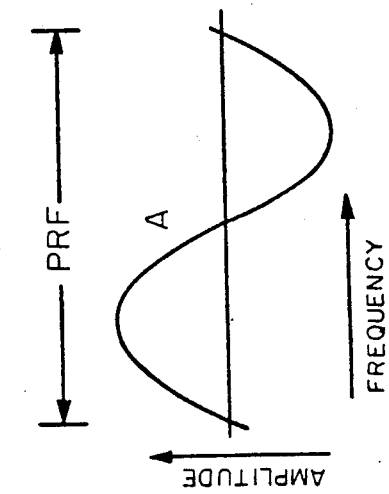

Exemplary waveforms illustrative of the frequency responses of signals A and B are shown in FIGS. 2A and 2B, respectively. As shown in FIGS. 2A and 2B, the response of signal A has odd symmetry about the center of the PRF interval, while the response of signal B has even symmetry about the center of the PRF interval. The signals A and B are defined by equations 3 and 4.

$$A = 2 \sin 2\pi((f_d - PRF/2)/PRF) \quad (3)$$

$$B = 4 (1 + \cos 2\pi((f_d - (PRF/2)/PRF) \quad (4)$$

The ratio of the signals A/B is given by equations 5 and 6.

$$A/B = (\sin 2\pi((f_d - (PRF/2)/PRF))/ \quad (5)$$
$$(2(1 + \cos 2\pi((f_d - (PRF/2)/PRF))$$
$$= (\tfrac{1}{2})(\tan \pi((f_d - (PRF/2)))/PRF)) \quad (6)$$

The estimated doppler frequency $\hat{f}_d$ is given by equation 7.

$$\hat{f}_d = PRF(\tfrac{1}{2} + (1/\pi)\tan^{-1}(2A/B)) \quad (7)$$

Figure 3:
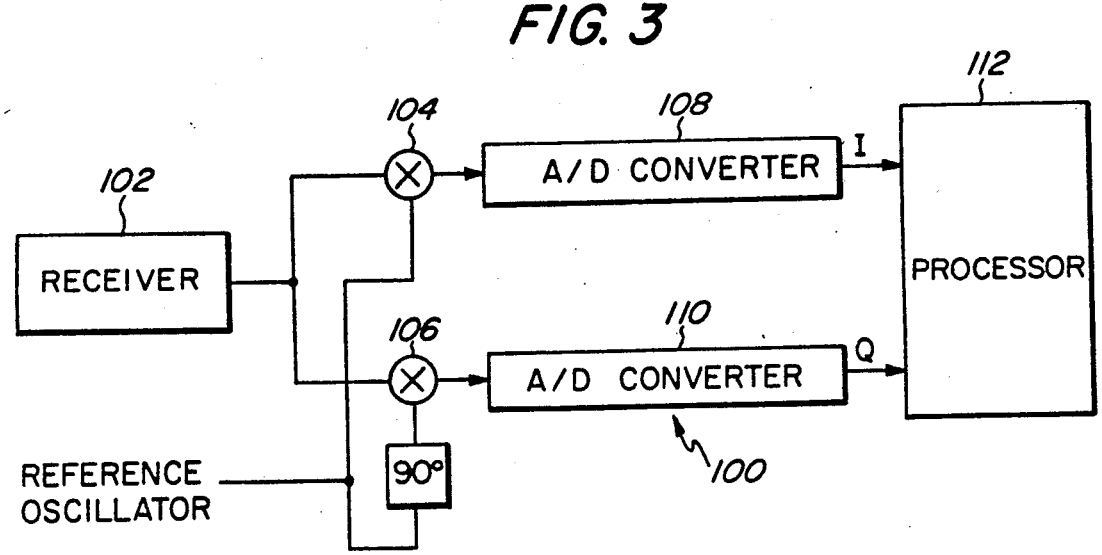
FIG. 3 is a simplified block diagram illustrative of a digital system embodying the invention.

A digital implementation 100 of the system is illustrated in FIG. 3. Here the signals from the radar receiver 102 are fed to mixers 104 and 106 for mixing with a local oscillator signal (mixer 104) and a version of the local oscillator signal which has been delayed by 90° (mixer 106). This yields inphase I and quadrature signals Q which are applied to respective analog-to-digital converter (ADC) devices 108 and 110. The resultant digitized inphase I and quadrature Q signals are applied to the digital processor 112 for processing to develop an estimate of the doppler frequency $f_d$ in accordance with the invention.

The processor 12 processes the I and Q signals to obtain the inphase and quadrature components of the A and B signals, i.e., $I_A$, $I_B$, $Q_A$ and $Q_B$.

$$I_B = I_1 - 2 I_2 + I_3 \quad (8)$$

$$Q_B = Q_1 - 2Q_3 + Q_3 \quad (9)$$

$$I_A = I_1 - I_3 \quad (10)$$

$$Q_A = Q_1 - Q_3 \quad (11)$$

where $I_1$ and $Q_1$ are the respective inphase and quadrature components of the return signal from the first transmitted pulse, delayed by 2/PRF to be time coincident with the return from the third transmitted pulse. Similarly, $I_2$ and $Q_2$ are the respective inphase and quadrature components of the return signal from the second transmitted pulse, delayed by 1/PRF to be time coincident with the return from the third transmitted pulse, and $I_3$ and $Q_3$ are the respective inphase and quadrature components of the return signal from the third transmitted pulse.

The signals A and B are given by equations 12 and 13.

$$A = I_A + jQ_A \quad (12)$$

$$B = I_B + jQ_B \quad (13)$$

A is orthogonal to B since A is an odd function and B is an even function. The ratio A/B is equivalent to $jA \cdot B/B^2$, where j appears because of the orthogonality of the signals A and B. The ratio can also be written as $$A/B = j(jI_AQ_B + jI_B + I_AI_B - Q_AQ_B)/(I^2_B + Q^2_B) \quad (14)$$

Because $I_BI_A = Q_BQ_A = 0$ since signals A and B are orthogonal, equation 14 can be rewritten as equation 15.

$$A/B = -(I_AQ_B + I_BQ_A)/(I^2_B + Q^2_B) \quad (15)$$

The estimated doppler frequency $\hat{f}_d$ can then be determined using the relationship of equation 7. The determination may be readily implemented with a PROM lookup table.

Figure 4:
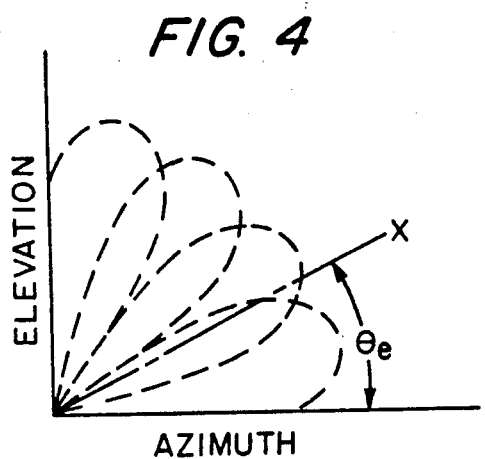
FIG. 4 is illustrative of beams of a 3-dimensional radar which are scanned in elevation.

As described above, one problem that has occurred on 3-dimensional radars is the inability to make an angle measurement when the target is straddled by two beams, one of which is employing an MTI waveform, and the other of which uses a single pulse, since the equivalent single pulse amplitude P from the MTI waveform is unknown. The beams of a simple 3-dimensional radar are illustrated in FIG. 4. By using the estimated doppler frequency obtained in accordance with the invention, an estimate of the single pulse amplitude from the MTI waveform can be made. This in turn allows a direct comparison to be made between the returns from the two beams using the sequential lobing technique described above to make an estimate of the elevation angle.

Figure 5:
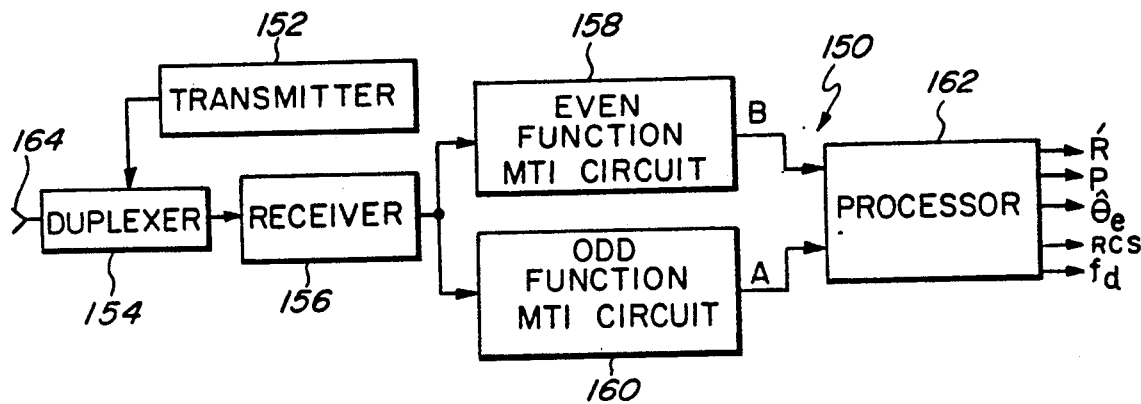
FIG. 5 is a simplified block diagram of a 3-dimensional radar system employing the invention.

FIG. 5 illustrates a simplified block diagram of a three-dimensional radar system 150, comprising transmitter 152 and receiver 156 which are connected to the system antenna 164 via the duplex 154. The radar receiver output signals are fed to the respective MTI circuits 158 and 160. The MTI circuit 158 is an even function MTI circuit which, for example, may be implemented as the double canceller circuit described with respect to FIG. 1. The MTI circuit 160 is an odd function MTI circuit which, for example, may be implemented as the single canceller circuit using a delay of 2/PRF as described above with respect to FIG. 1. The respective MTI circuit outputs of amplitudes B and A are fed to the processor 162. Depending on the application, the processor can comprise circuitry or (in a digital implementation) software for performing the functions described below.

The signals A and B have each been normalized to the single pulse response P which would have been obtained with a non MTI waveform in the absence of clutter return. This normalization is inherent if the delay has unity gain, as it would have for a digital implementation. Thus, $$B = 4(1 + \cos 2\pi(f_d/PRF - \tfrac{1}{4}))P. \tag{16}$$

P can be solved for a function of A and B. Substituting equation 5 into equation 16, the relationship of equation 17 is obtained.

$$B = 4(1 + \cos 2(\tan^{-1}(2A/B))P \tag{17}$$

Because $\cos(2\theta) = 2\cos^2\theta - 1$, equation 17 can be rewritten as follows:

$$B = 4(2\cos^2(\tan^{-1}(2A/B))P \tag{18}$$

Because $\cos(\tan^{-1}(2A/B)) = B/(B^2 + 4A^2)^{\frac{1}{2}}$, it follows that $$B = (8B^2/(B^2 + 4A^2))P, \text{ and} \tag{19}$$

$$P = B(B^2 + 4A^2)/8B^2 \tag{20}$$

Thus, an estimate of the equivalent single pulse amplitude P is obtained from the signal magnitudes A and B after having rejected the clutter return.

The simple estimator of equation (1) can be used to estimate the elevation angle $\theta_e$.

The invention may also be used where the target is straddled by two MTI beams with different PRFs, i.e., the PRF switching technique described above, since in each case an estimate can be made of the equivalent single pulse amplitude. Since the invention provides an estimate of the doppler position ($f_d$) of the return within the PRF interval, PRF switching can be employed with simple waveforms. With the PRF switching technique using two PRFs having a PRF difference s, the observed doppler frequency will not change if the target return is in the first PRF interval, will change by s if in the second PRF interval, by 2s if the third PRF interval, and so on. Thus, the unambiguous doppler frequency will be the measured ambiguous doppler frequency plus N times the PRF on which that measurement was made.

$$f_d = (\hat{f}_d) + (N)(PRF) \tag{21}$$

N is the multiple of s by which the measurement shifted when the PRF changed.

Once the unambiguous doppler frequency has been determined, the target range rate may be determined by the following relationship.

$$\text{Range Rate} = (\lambda f_d)/2 \tag{22}$$

Figure 6:
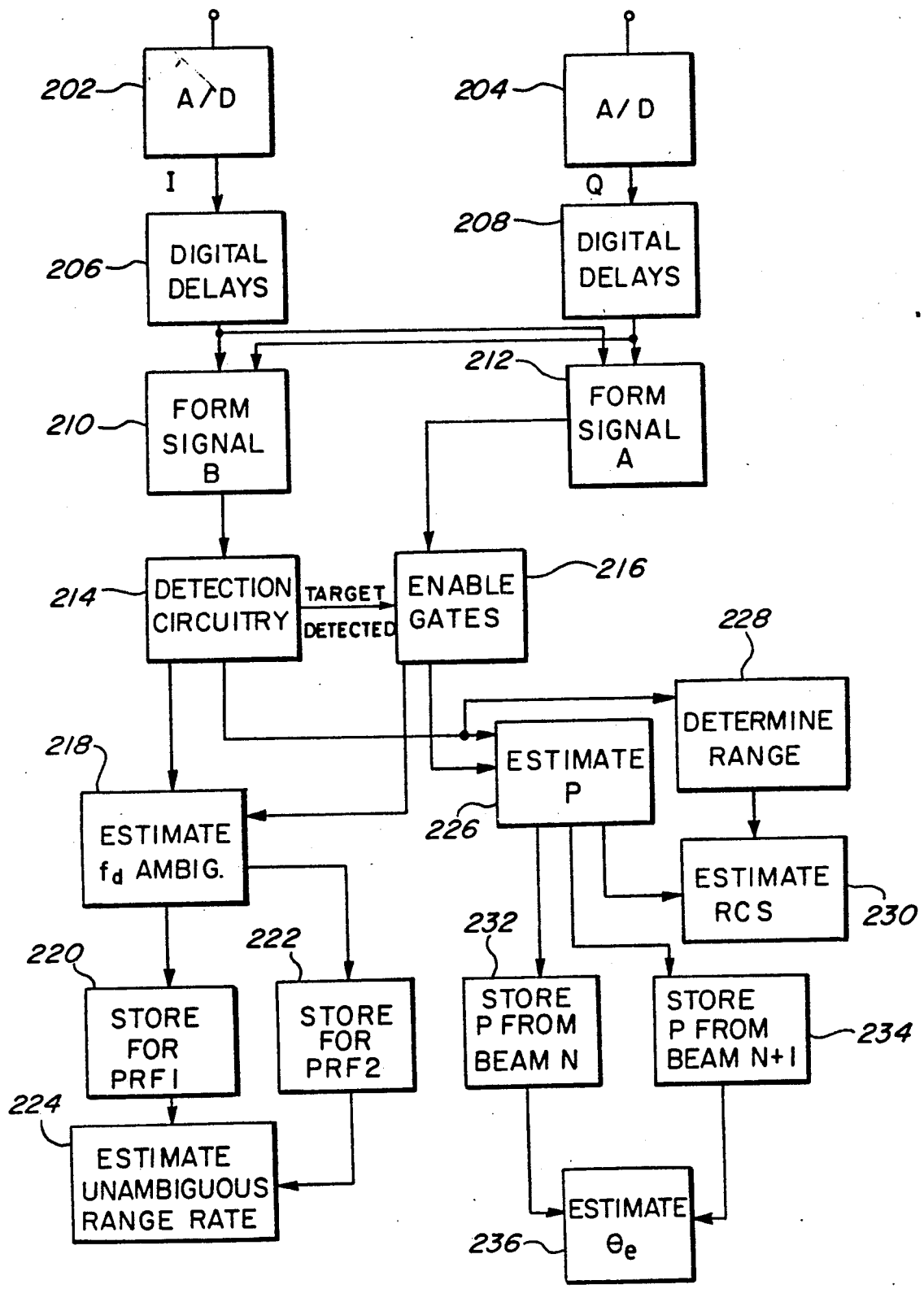
FIG. 6 is a functional flow diagram illustrating the utilization of the invention to determine the target doppler frequency, the equivalent single pulse amplitude, the target elevation angle, radar cross-section and unambiguous range rate.

FIG. 6 is a functional flow diagram illustrating the utilization of the invention to determine the target doppler frequency, the equivalent single pulse amplitude, the target elevation angle, radar cross-section and unambiguous range rate. This corresponds to functions which may be carried out by the digital implementation of FIG. 3. At steps 202 and 204, the inphase and quadrature components of the received signal are converted from analog form to digital signals (corresponding to the functions of A/D converters 108 and 110 of FIG. 3).

At steps 206 and 208, the digital forms of the inphase and quadrature components are subjected to digital delays to form the odd and even function MTI waveforms. The signals B and A (as described above) can then be formed at steps 210 and 212.

The signal B represents the output from the double canceller main MTI target detection channel, and at step 214 the value of the signal B is compared to a noise threshold value to distinguish a target from noise. When the value of B exceeds the noise threshold, a target is detected, enabling the gates at step 216 which puts into operation several operations. One operation is to estimate the ambiguous target doppler frequency (step 218) using the relationship of equation 7. When the PRF switching technique described above is employed, the unambiguous range rate can be established by first determining the unambiguous target doppler frequency in the manner described above regarding equation 21, and from that doppler frequency the unambiguous range rate can be determined using the relationship of equation 22. Thus, the ambiguous doppler frequency is first determined for the PRF1 and stored in memory (step 220). Next, the ambiguous target doppler frequency at the PRF2 is determined and stored in memory (step 222). From the stored values, the unambiguous target doppler frequency and the range rate are then determined (step 224).

Once a target is detected, the equivalent single pulse amplitude P of the MTI waveform can be estimated (step 226) via the relationship of equation 20. From the estimate of P and the target range (determined at step 228 by well-known techniques), the radar cross section (RCS) is determined via the relationship of equation 2.

The estimate of the equivalent single pulse amplitude P of the MTI waveform can further be employed in a three-dimensional radar to estimate the elevation angle of the target, where the target is straddled by beams N and N+1. First, the amplitude P of the MTI waveform, say from beam N, is estimated and stored (at step 232). Next, the single pulse amplitude of the next beam N+1 (or the equivalent single pulse amplitude if beam N+1 also employs an MTI waveform) is determined and stored (at step 234). The target elevation angle is then estimated (at step 236) via the relationship of equation 1. It is to be understood that the invention is not limited to estimating the target elevation angle, but is useful generally in estimating the angle position of a target straddled by two beams, at least one of which employs an MTI waveform.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. A system for estimating the doppler frequency of the target return produced by a moving target indicator (MTI) radar operating at a pulse repetition frequency (PRF, comprising:
   a first MTI circuit responsive to the target return for providing a first MTI return signal A characterized by a frequency response having odd symmetry about the center of the PRF interval;
   a second MTI circuit responsive to the target return for providing a second MTI return signal B characterized by a frequency response having even symmetry about the center of the PRF interval;
   means responsive to the first and second signals for generating a ratio signal indicative of the ratio of the relative magnitudes of the first and second signals; and
   means responsive to said ratio signal for estimating the doppler frequency of the target return.

2. The system of claim 1 wherein said second MTI circuit comprises a double canceller MTI circuit and said first MTI circuit comprises a single canceller MTI circuit employing a delay of 2/PRF.

3. The system of claim 1 further comprising means responsive to the first and second MTI return signals for estimating the equivalent single pulse amplitude P from the MTI waveform.

4. A three-dimensional radar system operating at a pulse repetition frequency (PRF) including an antenna which rotates in azimuth while generating a sequential scan of beams in elevation, and wherein Moving Target Indicator (MTI) waveforms are employed on the lower beam or beams of the elevation scan to suppress clutter, characterized by a means for estimating the equivalent single pulse amplitude from the MTI waveform, comprising:
   a first MTI circuit responsive to the target return for providing a first MTI signal of amplitude A characterized by a frequency response having odd symmetry about the center of the PRF interval;
   a second MTI circuit responsive to the target return for providing a second MTI signal of amplitude B characterized by a frequency response having even symmetry about the center of the PRF interval;
   means response to the first and second MTI signals for estimating the equivalent single pulse amplitude P from the MTI waveform.

5. A system for estimating the doppler frequency of the target return produced by a moving target indicator (MTI) radar operating at a pulse repetition frequency (PRF) comprising:
   a radar receiver for producing receiver return signals;
   a first MTI circuit responsive to the receiver return signal for providing a first MTI signal characterized by a frequency response having odd symmetry about the center of the PRF interval, said first MTI circuit comprising a signal canceller MTI circuit employing a delay of 2/PRF;
   a second MTI circuit responsive to the receiver return signal for providing a second MTI signal characterized by a frequency response having even symmetry about the center of the PRF interval, said second MTI circuit comprising an MTI double canceller circuit;
   means responsive to the first and second MTI signals for generating a ratio signal indicative of the ratio of the relative magnitudes of the first MTI signal to the second MTI signal; and
   means responsive to said ratio signal for estimating the doppler frequency of the target return in accordance with the relationship $$\hat{f_d} = PRF\,(\tfrac{1}{4} + (1/\pi)\tan^{-1}(2A/B)).$$

6. The system of claim 5 wherein the radar is operated at mulitple PRFs, and said system further comprises means for estimating the unambiguous target range rate, comprising:
   means responsive to said ratio signal while the radar is operated at a first PRF for estimating the target doppler at the first PRF;
   means responsive to said ratio signal while the radar is operated at a second PRF for estimating the target doppler at the second PRF, wherein the difference between the first and second PRFs is s; and
   means for determining the unambiguous target doppler from the estimated dopplers at the first and second PRFs.

7. The system of claim 6 wherein said means for determining the unambiguous target doppler from the estimated dopplers at the first and second PRFs comprises means for calculating the unambiguous doppler in accordance with the relationship $$f_d = (\hat{f_D}\,(PRF1)) + N(PRF\,1)$$

where N is the multiple of s by which the measured target doppler at the first PRF (PRF 1) differs from the measured target doppler at the second PRF (PRF 2).

8. The system of claim 5 further comprising means responsive to the first and second MTI return signals for estimating the equivalent single pulse amplitude P from the MTI waveform.

9. The system of claim 8 wherein said estimating means comprises means for estimating the equivalent single pulse amplitude P in accordance with the relationship $$P = B(B^2 + 4A^2)/8B^2.$$

10. The system of claim 8 further comprising means responsive to said estimated equivalent single pulse amplitude P for estimating the target radar cross-section.

11. A system for estimating the doppler frequency of the target return produced by a moving target indicator (MTI) radar operating at a pulse repetition frequency (PRF), comprising:
- a first MTI circuit responsive to the target return for providing a first MTI return signal A characterized by a frequency response having odd symmetry about the center of the PRF interval;
- a second MTI circuit responsive to the target return for providing a second MTI return signal B characterized by a frequency response having even symmetry about the center of the PRF interval;
- means responsive to the first and second MTI return signals for generating a ratio signal indicative of the ratio of the relative magnitudes of the first and second signals; and
- means responsive to said ratio signal for estimating the doppler frequency of the target return in accordance with the relationship $$\hat{f}_d = PRF(\tfrac{1}{4} + (1/\pi)\tan^{-1}(2A/B)).$$

12. A system for estimating the doppler frequency of the target return produced by a moving target indicator (MTI) radar operating at mulitple pulse repetition frequencies (PRFs), comprising:
- a first MTI circuit responsive to the target return for providing a first MTI return signal A characterized by a frequency response having odd symmetry about the center of the PRF interval;
- a second MTI circuit responsive to the target return for providing a second MTI return signal B characterized by a frequency response having even symmetry about the center of the PRF interval;
- means responsive to the first and second signals for generating a ratio signal indicative of the ratio of the relative magnitudes of the first and second signals;
- means responsive to said ratio signal for estimating the doppler frequency of the target return; and
- means for estimating the unambiguous target range rate, comprising:
  - means responsive to said ratio signal while the radar is operated at a first PRF for estimating the target doppler at the first PRF;
  - means responsive to said ratio signal while the radar is operated at a second PRF for estimating the target doppler at the second PRF, wherein the difference between the first and second PRFs is s; and
  - means for determining the unambiguous target doppler from the estimated dopplers at the first and second PRFs.

13. The system of claim 12 wherein said means for determining the unambiguous target doppler from the estimated dopplers at the first and second PRFs comprises means for calculating the unambiguous doppler in accordance with the relationship $$\hat{f}_d = (\hat{f}_D(PRF\ 1)) + N(PRF\ 1)$$

where N is the multiple of s by which the measured target doppler at the first PRF (PRF 1) differs from the measured target doppler at the second PRF (PRF 2).

14. A system for estimating the doppler frequency of the target return produced by a moving target indicator (MTI) radar operating at a pulse repetition frequency (PRF), comprising:
- a first MTI circuit responsive to the target return for providing a first MTI return signal A characterized by a frequency response having odd symmetry about the center of the PRF interval;
- a second MTI circuit responsive to the target return for providing a second MTI return signal B characterized by a frequency response having even symmetry about the center of the PRF interval;
- means responsive to the first and second signals for generating a ratio signal indicative of the ratio of the relative magnitudes of the first and second signals;
- means responsive to said ratio signal for estimating the doppler frequency of the target return; and
- means responsive to the first and second MTI return signals for estimating the equivalent single pulse amplitude P from the MTI waveform in accordance with the relationship $$P = B(B^2 + 4A^2)/8B^2.$$

15. A system for estimating the doppler frequency of the target return produced by a moving target indicator (MTI) radar operating at a pulse repetition frequency (PRF), comprising:
- a first MTI circuit responsive to the target return for providing a first MTI return signal A characterized by a frequency response having odd symmetry about the center of the PRF interval;
- a second MTI circuit responsive to the target return for providing a second MTI return signal B characterized by a frequency response having even symmetry about the center of the PRF interval;
- means responsive to the first and second signals for generating a ratio signal indicative of the ratio of the relative magnitudes of the first and second signals;
- means responsive to said ratio signal for estimating the doppler frequency of the target return; and
- means responsive to the first and second MTI return signals for estimating the equivalent single pulse amplitude P from the MTI waveform; and
- means responsive to said estimate equivalent single pulse amplitude P for estimating the target radar cross-section.

16. A three-dimensional radar system operating at a pulse repetition frequency (PRF) including an antenna which rotates in azimuth while generating a sequential scan of beams in elevation, and wherein Moving Target Indicator (MTI) waveforms are employed on the lower beam or beams of the elevation scan to suppress clutter, characterized by a means for estimating the equivalent single pulse amplitude from the MTI waveform, comprising:
- a first MTI circuit responsive to the target return for providing a first MTI signal of amplitude A characterized by a frequency response having odd symmetry about the center of the PRF interval;
- a second MTI circuit responsive to the target return for providing a second MTI signal of amplitude B characterized by a frequency response having even symmetry about the center of the PRF interval; and
- means responsive to the first and second MTI signals for estimating the equivalent single pulse amplitude P from the MTI waveform in accordance with the relationship $$P = B(B^2 + 4A^2)/8B^2.$$

17. A three-dimensional radar system operating at a pulse repetition frequency (PRF) including an antenna which rotates in azimuth while generating a sequential scan of beams in elevation, and wherein Moving Target Indicator (MTI) waveforms are employed on the lower beam or beams of the elevation scan to suppress clutter, characterized by a means for estimating the equivalent single pulse amplitude from the MTI waveform, comprising:

a first MTI circuit responsive to the target return for providing a first MTI signal of amplitude A characterized by a frequency response having odd symmetry about the center of the PRF interval;

a second MTI circuit responsive to the target return for providing a second MTI signal of amplitude B characterized by a frequency response having even symmetry about the center of the PRF interval;

means responsive to the first and second MTI signals for estimating the equivalent single pulse amplitude P from the MTI waveform;

means for estimating the radar cross-section (RCS) of the target in accordance with the relationship $$RCS = k\, P^2/R^4$$

where P is the estimate of the equivalent single pulse amplitude, k is a constant dependent on the radar system sensitivity and R is the range to the target.

18. A three-dimensional radar system operating at a pulse repetition frequency (PRF) including an antenna which rotates in azimuth while generating a sequential scan of beams in elevation, and wherein Moving Target Indicator (MTI) waveforms are employed on the lower beam or beams of the elevation scan to suppress clutter, characterized by a means for estimating the equivalent single pulse amplitude from the MTI waveform, further characterized in that a target may be straddled by two beams, one of which is employing an MTI waveform and the other of which is employing a single pulse waveform, comprising:

a first MTI circuit responsive to the target return for providing a first MTI signal of amplitude A characterized by a frequency response having odd symmetry about the center of the PRF interval;

a second MTI circuit responsive to the target return for providing a second MTI signal of amplitude B characterized by a frequency response having even symmetry about the center of the PRF interval;

means responsive to the first and second MTI signals for estimating the equivalent single pulse amplitude P from the MTI waveform; and means for estimating the target angle position between the two straddling beams, comprising:

means for determining the amplitude P1 of the target return from the single pulse waveform; and means responsive to the estimated single pulse amplitude P from the MTI waveform and the amplitude P1 of the target return from the single waveform for estimating the target angle $\theta$ in accordance with the relationship $$\theta = k(\log P1 - \log P) + \theta_o,$$

where k is a constant related to the beam spacing and beam width, and $\theta$ is the angle at the crossover between the beams.

19. A three-dimensional radar system operating at a pulse repetition frequency (PRF) including an antenna which rotates in azimuth while generating a sequential scan of beams in elevation, and wherein Moving Target Indicator (MTI) waveforms are employed on the lower beam or beams of the elevation scan to suppress clutter, and wherein a target is straddled by first and second beams, each of which is an MTI waveform but on different respective PRFS (PRF1 and PRF'), characterized by a means for estimating the equivalent single pulse amplitude from the MTI waveform, comprising:

a first MTI circuit responsive to the target return for providing a first MTI signal of amplitude A characterized by a frequency response having odd symmetry about the center of the PRF interval;

a second MTI circuit responsive to the target return for providing a second MTI signal of amplitude B characterized by a frequency response having even symmetry about the center of the PRF interval;

means responsive to the first and second MTI signals for estimating the equivalent single pulse amplitude P from the MTI waveform; and means for estimating the target angle position between the two beams, comprising:

means responsive to the estimated single pulse amplitude P1 from the first beam MTI waveform at PRF1 and the estimated single pulse amplitude P2 from the second beam MTI waveform at PRF2 for estimating the target angle position $\theta$ between the two beams in accordance with the relationship $$\theta = k(\log P2 - \log P1) + \theta_o,$$

where k is a constant related to the beam spacing and beam width, and $\theta_o$ is the angle at the crossover between the two beams.

* * * * *